United States Patent [19]
Van Ochten et al.

[11] Patent Number: 5,982,479
[45] Date of Patent: Nov. 9, 1999

[54] METHOD FOR CALIBRATING A TILT INSPECTION SYSTEM AND REFERENCE DISK ASSEMBLY FOR USE THEREIN

[75] Inventors: Mitchell G. Van Ochten, Livonia; Matthew P. Frazer, Plymouth, both of Mich.

[73] Assignee: Medar, Inc., Farmington Hills, Mich.

[21] Appl. No.: 08/962,635

[22] Filed: Nov. 3, 1997

Related U.S. Application Data

[63] Continuation-in-part of application No. 08/801,903, Feb. 14, 1997, Pat. No. 5,815,255.

[51] Int. Cl.⁶ .......................... G01B 11/26; G01B 11/30; G01B 11/00; G01C 1/00
[52] U.S. Cl. .......................... 356/138; 356/371; 356/394; 356/375; 356/376; 356/237.4; 356/237.5
[58] Field of Search ..................................... 356/138, 371, 356/373, 375, 376, 394, 398, 139.07, 237.4, 237.5

[56] References Cited

U.S. PATENT DOCUMENTS

| | | |
|---|---|---|
| 4,297,034 | 10/1981 | Ito et al. . |
| 4,672,196 | 6/1987 | Canino ..................................... 356/369 |
| 4,850,695 | 7/1989 | Mikuriya et al. ........................ 356/237 |
| 5,646,415 | 7/1997 | Yanagisawa . |
| 5,815,255 | 9/1998 | Van Ochten et al. . |
| 5,875,029 | 2/1999 | Jann et al. ............................... 356/345 |

*Primary Examiner*—Frank G. Font
*Assistant Examiner*—Roy M. Punnoose
*Attorney, Agent, or Firm*—Brooks & Kushman P.C.

[57] ABSTRACT

A method is provided for calibrating a tilt inspection system and a reference disk assembly for use therein wherein a mirror disk of the assembly is attached to a rotatable member of the system by a beveled washer so that the mirror disk rotates at a predetermined tilt angle with respect to an axis of rotation of the rotatable member. As the reference disk assembly is rotated by the tilt inspection system at a relatively slow and constant angular velocity, a beam of light is reflected off the mirror disk to a position sensitive detector (i.e., PSD) and subscribes a circle on the face of the PSD. The tilt inspection system samples the channels from the PSD throughout one revolution of the mirror disk. Calibration or reference data is calculated in the form of tilt transformations. Four basic steps are involved: 1) acquisition of PSD voltage data when the reference disk assembly is rotated within the tilt inspection system; 2) analysis of the data to determine location of a reference marker formed on the mirror disk; 3) fitting of the data to sine functions; and 4) computing the tilt transformations. This approach provides a simple, highly accurate, calibration procedure that minimizes chances for operator error and the affects of system noise.

15 Claims, 3 Drawing Sheets

METHOD FOR CALIBRATING A TILT INSPECTION SYSTEM AND REFERENCE DISK ASSEMBLY FOR USE THEREIN

CROSS-REFERENCE TO RELATED APPLICATION

This application is related to and is a continuation-in-part application of U.S. application Ser. No. 08/801,903, filed on Feb. 14, 1997, entitled "Method And System For Measuring Deflection Angle Of A Beam Of Light Reflected From A Disk To Determine Tilt Of The Disk", now U.S. Pat. No. 5,815,255 issued on Sep. 29, 1998.

TECHNICAL FIELD

This invention relates to methods for calibrating a tilt inspection system and a reference disk assembly for use therein.

BACKGROUND ART

U.S. Pat. No. 5,646,415 discloses an apparatus for inspecting radial skew and tangential skew on the basis of a spatial difference between nearby sensor outputs and a sensor output of a center address position.

Tilt inspection systems may determine tilt by measuring deflection angle of a beam of light reflected from an object as disclosed in the above-noted co-pending patent application.

Such systems may utilize a lateral effect photodiode position sensing detector or device (PSD) which is continuous and allows for greater accuracy than multicell detectors.

Preferably, it is desirable to use a position sensing detector which is small and which is relatively low cost. Such photodiodes are available from On-Trak Photonics, Inc. of Lake Forest, Calif. and have the designation 2L2SP or 2L4SP to indicate that the photodiode is a duo-lateral, two-dimensional position sensing detector.

One problem with use of such a relatively low cost position sensing detector is that slight alignment errors in the photodiode and/or its active area causes undesirable interaction between the X and Y axes of the active area. For example, the detector active area which comprises a thin rectangular slice of silicon may have a two degree rotational error with respect to the rest of the photodiode which results in an unacceptable amount of error in determining deflection angle and thereby tilt.

An object of the invention of the above-noted patent application is to provide a method and system for measuring a deflection angle of a beam of light reflected from a disk to detect tilt of the disk wherein alignment errors are corrected by processing reference data related to a known tilt of a reference disk with at least one electrical signal generated by a photodetector positioned in a detector plane to detect a focused spot of the reflected beam.

One problem of utilizing such a reference disk is that it may be difficult to manufacture such a reference disk that has the same value of tilt for both inner and outer radii. On systems with two or more tilt heads at differing radii, one must enter additional data pairs for each additional head up to a total of 30 entries for a 3 head tilt when using 5 known tilt angles.

SUMMARY OF THE INVENTION

An object of the present invention is to provide a method for calibrating a tilt inspection system and a reference disk assembly for use therein wherein a disk having a specular planar layer is secured to a rotatable member of the tilt inspection system at a predetermined tilt angle with respect to an axis about which the member rotates.

Yet another object of the present invention is to provide a method for calibrating a tilt inspection system and a reference disk assembly for use therein wherein the reference disk assembly includes a disk including a specular planar layer having a surface normal and a coupler. The surface normal is at a predetermined tilt angle with respect to the axis when the coupler couples the disk to a rotatable member of the tilt inspection system.

Yet, still another object of the present invention is to provide a method for calibrating a tilt inspection system and a reference disk assembly for use therein wherein a mechanism is provided for attenuating reflection of a beam of controlled light from a predetermined position on a disk of the assembly, to thereby provide a reference marker on the disk.

In carrying out the above objects and other objects of the present invention, a method is provided for calibrating a tilt inspection system including a member which rotates a disk to be inspected about an axis. The method includes the steps of securing a disk including a specular planar layer having a surface normal to the member to rotate therewith so that the surface normal is at a predetermined tilt angle with respect to the axis. The method also includes the step of rotating the disk so that the disk has an angular velocity. The method also includes the step of directing a beam of controlled light at the planar layer during the step of rotating to generate a corresponding reflected light signal having an angular displacement which varies during the step of rotating based on the tilt angle. The method further includes the step of receiving the reflected light signal with an optical component for creating a relatively small focused spot of light from the reflected light signal in a detector plane wherein the optical component transforms the varying angular displacement of the reflected light signal into a curved displacement of the focused spot of light in the detector plane. The method also includes the step of measuring position of radiant energy in the focused spot of light in the detector plane and producing a pair of electrical signals proportional to the curved displacement. The method also includes the step of processing the pair of electrical signals with tilt angle data based on the tilt angle to obtain reference data. The method finally includes the step of storing the reference data in the tilt inspection system to calibrate the system.

Further in carrying out the above objects and other objects of the present invention, a reference disk assembly is provided for use in calibrating a tilt inspection system. The tilt inspection system includes a member for rotating a disk to be inspected about an axis. The assembly includes a disk having a specular planar layer with a surface normal for reflecting a beam of controlled light to generate a corresponding reflected light signal having an angular displacement. The assembly also includes a coupler secured to the disk and adapted to secure the disk to the member so that during rotation of the member, the surface normal is at a predetermined tilt angle with respect to the axis and the angular displacement varies based on the predetermined tilt angle.

Preferably, reflection of the beam of controlled light from the specular planar layer is attenuated at a predetermined position on the disk.

Also, preferably, the method further includes the step of measuring amount of radiant energy in the focused spot of light in the detector plane and producing a third electrical signal based on the measured amount of radiant energy and wherein the third electrical signal is processed with a pair of electrical signals and the tilt angle data to obtain the reference data.

The advantages accruing to the method and assembly of the present invention are numerous. For example, use of the method and the assembly therein provide a simple yet highly accurate calibration procedure that minimizes chances for operator error and the effects of system noise.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
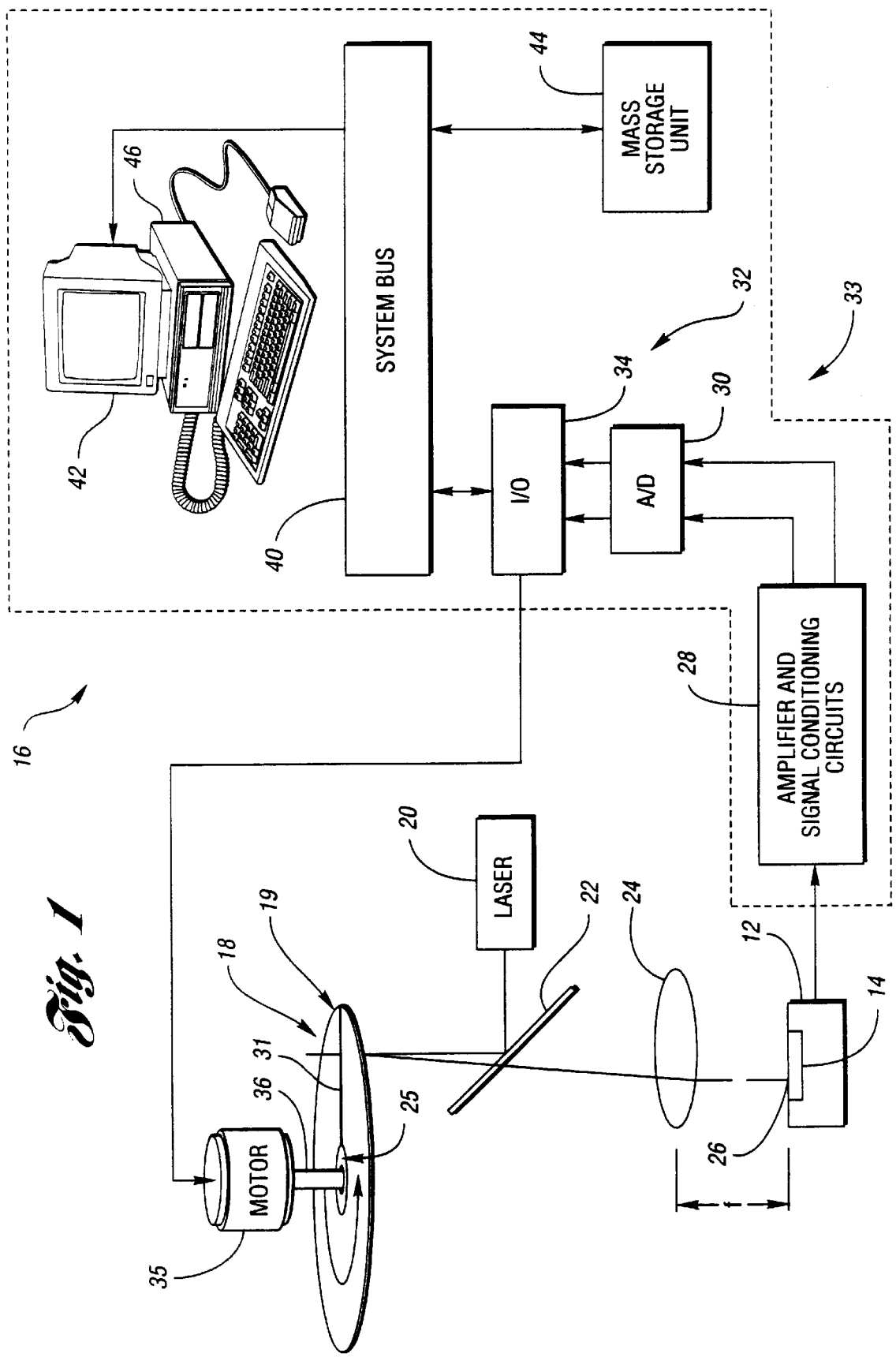
FIG. 1 is a schematic diagram illustrating a tilt inspection system calibrated in accordance with the method of the present invention.

Referring to the drawing Figures, there is illustrated in FIG. 1, a tilt inspection system, generally indicated at 16, for measuring deflection angle of a beam of light reflected from a disk such as an optical disk to determine tilt or warpage of the disk. The system 16 is utilized to measure both radial and tangential tilt components of the disk. The disk may be an optical media substrate such as an optical or MO disk. Optical or compact disks typically include DVD's, audio CD's, CD-R and CD-ROM devices.

The present invention involves a method for calibrating the system 16 and a reference disk assembly, generally indicated at 18, for use in the method. The method generally involves use of the assembly 18 in the system 16 to obtain reference data which is stored for future use by the system 16 when measuring deflection angle of a beam of light reflected from a disk to be inspected for tilt or warpage.

Figure 3:
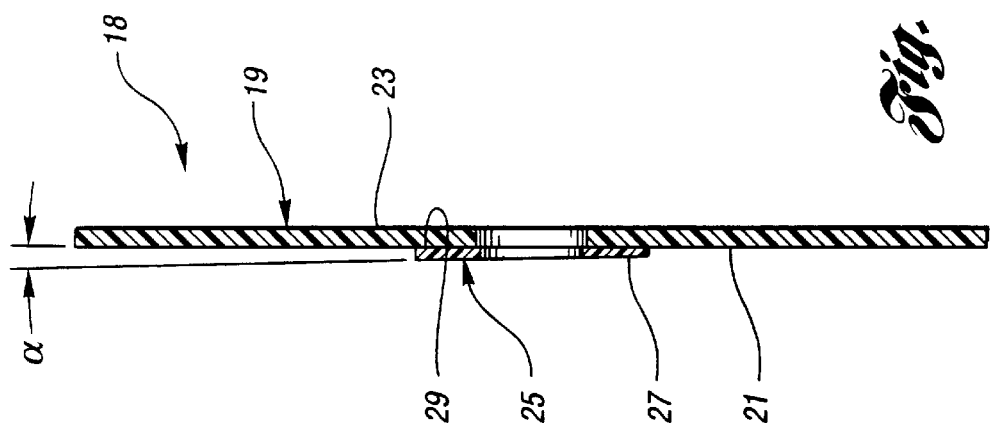
FIG. 3 is a side elevational view of the assembly of FIG. 2 with the size of the angle α exaggerated for illustrative purposes.
Figure 2:
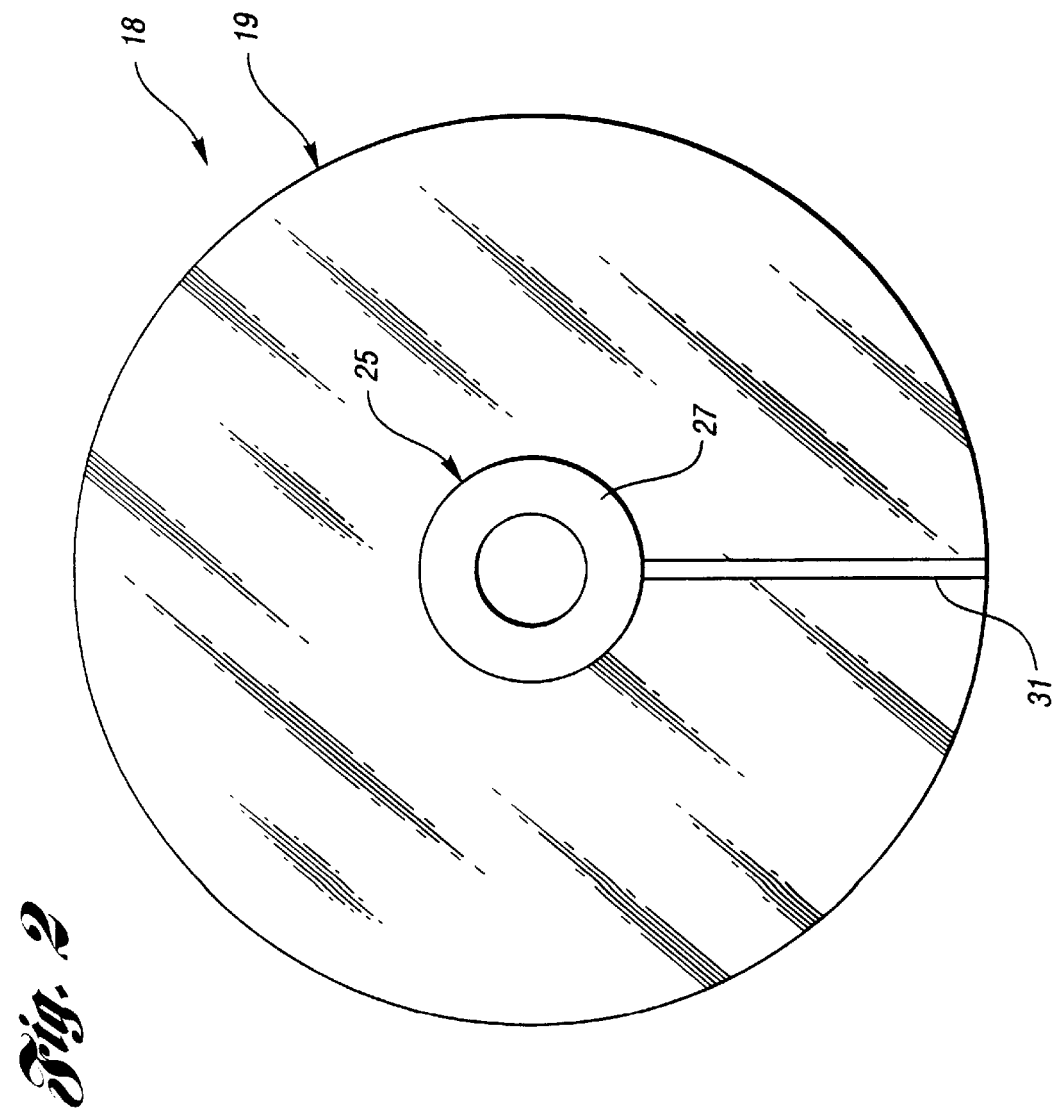
FIG. 2 is a front elevational view of a reference disk assembly constructed in accordance with the present invention.

Referring now to FIGS. 2 and 3, the assembly 18 includes a flat mirror disk, generally indicated at 19, having a specular, planar surface layer 21 and a transparent base layer 23. The assembly 18 also includes a coupler in the form of a washer, generally indicated at 25, having a face 27 which is beveled or machined so that it is angled with respect to its opposite face 29 at a small angle, α, such as approximately 1°. Preferably, the axle is in the range of 0.2° to 1°. The washer 25 is attached at its face 29 to the disk 19 such as by glue or an epoxy.

As indicated in FIG. 1, the washer 25 provides a known tilt value to the disk 19 when the assembly 18 is placed on a spindle or shaft 36 of the system 16. When rotated, the tilt angles at a given radius of the disk 19 will change sinusoidally. The tilt angles will change from zero, up to a maximum value (the angle, α, of the beveled washer 25 as illustrated in FIG. 3), then back through zero down to a negative angle of the same magnitude as the maximum. As the disk 19 is rotating, both radial and tangential tilt values will follow the same sinusoidal signal, though they will be 90° out of phase. That is, when tangential tilt is at the maximum, radial tilt will be zero; when tangential tilt is at zero, radial will be at the maximum, etc.

The disk 19 also contains a marker to provide a reference point. In the preferred embodiment, the marker is a thin line 31 etched into the mirror surface layer 21. The amplitude of the reflected light along this line 31 is greatly decreased or attenuated. This marks a point of known tilt values on the disk 19. For the case of simplicity, this marker is placed at the point of maximum (or minimum) radial tilt.

Alternatively, the marker can be a radially extending opaque stripe formed on the transport base layer 23 to prevent reflection of the beam of controlled light from reaching and reflecting from the shiny surface layer 21.

Referring again to FIG. 1, the system 16 preferably includes a laser such as a visible, solid state laser diode 20 to illuminate a surface of the disk 19 through the use of a beam splitter 22. Reflections from the surface layer 21 of the disk 19 are recovered through the beam splitter 22 and focused by an optical component such as a focusing lens 24 onto a two-dimensional position sensing detector which is preferably a silicon photodiode 12. The photodiode 12 is preferably a lateral effect photodiode position sensing detector or device (PSD) which is continuous. The position sensing detector is small and is relatively low cost. Such a photodiode 12 is available from On-Trak Photonics, Inc. of Lake Forest, Calif. and has the designation 2L2SP or 2L4SP to indicate that the photodiode is a duo-lateral, two-dimensional position sensing detector.

The photodiode 12 provides analog output signals (i.e., X and Y voltage signals) directly proportional to the position of a light spot 26 on its active area 14. The detector 12 (along with the amplifier and signal conditioning circuits 28 noted below) allows one to monitor two-dimensional position independent of fluctuations in intensity of the light spot 26.

The photodiode 12 also provides a composite amplitude signal which is a function of the absolute power of the received light spot 26.

The analog electrical output signals from the detector 12 are processed by a signal processor, generally indicated at 33. The signal processor 33 includes amplifier and signal conditioning circuits 28 which amplify and condition the signals and separates the signals into X and Y components and the composite amplitude signal for input into an analog-to-digital converter circuit 30 of the processor 33. The X and Y components as well as the composite amplitude signal are digitized and the resulting digital signals are input into a host computer system, generally indicated at 32 of the processor 33. The system 32 processes the digital signals to ultimately yield sampled values related to the absolute position of the spot 26 on the active area 14 which, in turn, is related to the predetermined tilt angle of the disk assembly 19. The system 32 also processes the digital signals to ultimately yield sampled values based on the composite amplitude signal.

The computer system 32 includes input/output circuits 34 to allow the system 32 to communicate with the A/D converter circuits 30, as well as with an electrical motor 35 which includes the shaft 36 for rotating the disk assembly 18 upon energization of the motor 35.

Typically, the rotating disk 18 produces a varying beam deflection angle to cause the light spot 26 to move in a circle over the active area 14 of the detector 12, thereby producing varying electrical signals which are subsequently processed by the signal processor 33.

The computer system 32 also includes a system bus 40 which may be either a PCI, an EISA, ISA, or VME system bus or any other standard bus to allow inter-system communication such as with a monitor 42 of the computer system 32.

The computer system 32 may be programmed at a mass storage unit 44 to include a computer program useful in the generation of reference or calibration data, where the system 16 measures the deflection angle of a beam of light reflected from the reference disk assembly 18 having the known tilt.

The computer system 32 also includes a host computer 46 which may be a PC having a sufficient amount of RAM and hard disk space for computer programs for controlling the computer system 32.

Data Acquisition

A large number of PSD voltage samples (minimum of three) are taken at various known locations around the disk 19 to provide the calibration information. In practice, this is best accomplished by rotating the disk 19 at a constant, known velocity as illustrated at block 46 in FIG. 4, and taking equally spaced PSD voltage samples as it is rotating, as indicated at block 48. Along with the PSD voltages in each axis, the composite amplitude signal from the PSD is monitored and sampled as also indicated by block 48.

By taking a large number of samples (on the order of hundreds), noise variations may be averaged out of the data.

Figure 5:
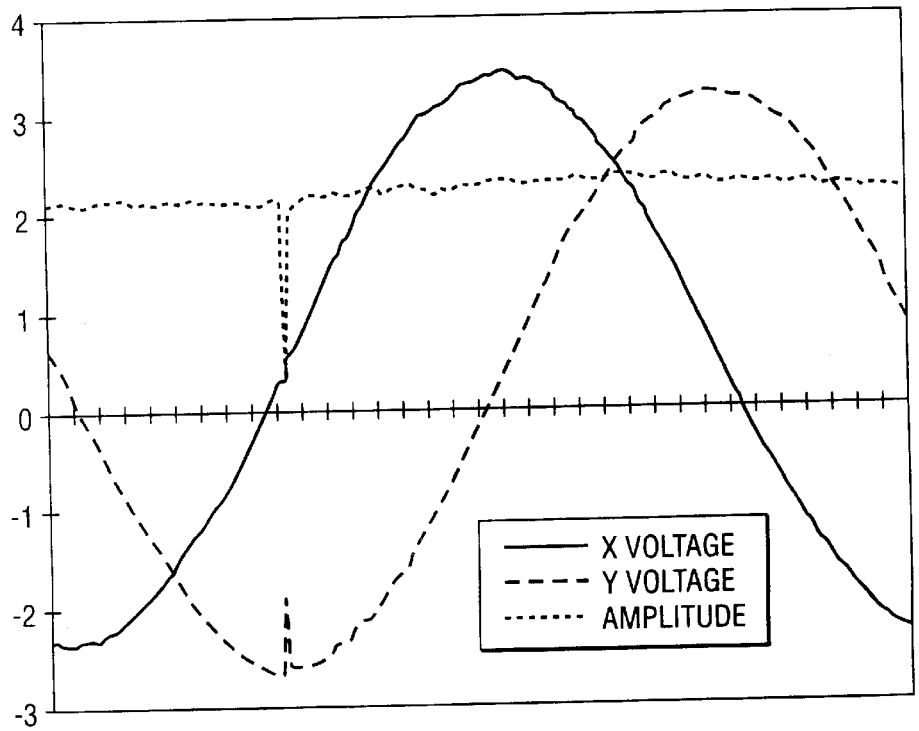
FIG. 5 is a graph illustrating how sampled X and Y signals and a composite amplitude signal from the PSD vary as the reference disk assembly rotates.

A sample graph of the PSD voltages for both axes, and the composite amplitude signal is shown in FIG. 5. In this case, a sample was taken approximately every one degree of rotation. A sharp drop in the amplitude signal, identifying the location of the reference marker is illustrated.

Identify Reference Marker

The reference marker may be easily identified by a sudden drop of the composite amplitude signal, as previously mentioned. A weighted average of the amplitude samples in the dropout region gives the center location of the marker:

$$C = \frac{\sum A_i * i}{\sum A_i}$$

where:

C is calculated center location of the marker; and $A_i$ are amplitude samples.

The center location is computed as the angular offset from the beginning of the acquired data set, as indicated at block 50.

Fit Input Data To Sin Functions

The X and Y axis PSD voltage data sets are known to represent a sinusoidal signal, so a least-square fit to a sin function is performed for each data set, as indicated at block 52.

$$V_x(\theta)=x_1+x_2 \sin(\theta)+x_3 \cos(\theta)$$

$$V_y(\theta)=y_1+y_2 \sin(\theta)+y_3 \cos(\theta)$$

where:

$V(\theta)$ is predicted voltage for given location on the disk 19;

$\theta$ is angular location on the calibration disk 19; and $x_n$, $y_n$ are sin fit coefficients.

Compute Transformation

A linear tilt model, as described in the above-noted application, is used as the basis for determining the tilt transformations. This model provides a linear version of the tilt system, making possible a linear solution to the data.

$$\alpha_t=t_1 v_x+t_2 v_y+t_3$$

$$\alpha_r=r_1 v_x+r_2 v_y+r_3$$

where:

$\alpha_t$ is tangential tilt angle;

$\alpha_r$ is radial tilt angle;

$t_n$ are tangential calibration coefficients;

$r_n$ are radial calibration coefficients;

$v_x$ is PSD voltage in the x axis; and $v_y$ is PSD voltage in the y axis.

Figure 4:
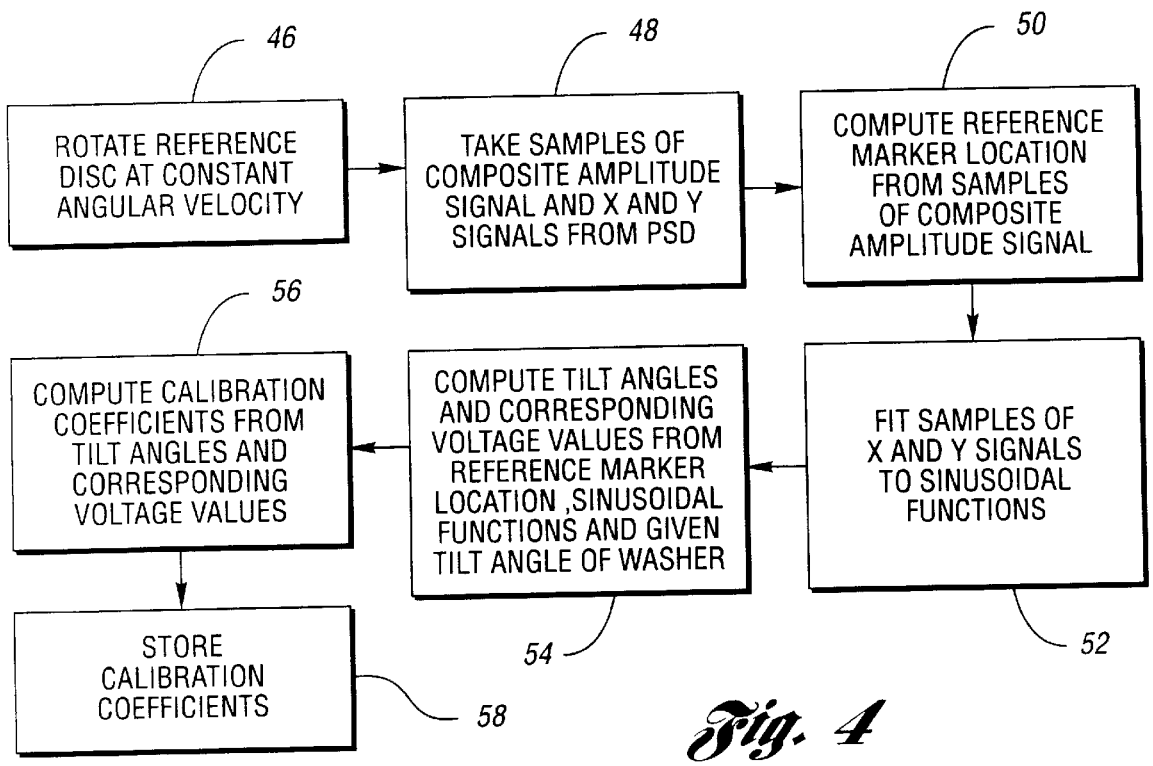
FIG. 4 is a schematic block diagram illustrating the method of the present invention.

As noted at block 54 of FIG. 4, given the marker location computed above and the tilt angle of the calibration disk 19, a number of known tilt values for various locations on the disk 19 can be computed.

$$\alpha_T(\phi)=T \cos(\phi-C)$$

$$\alpha_r(\phi)=T \sin(\phi-C)$$

where:

$\alpha(\phi)$ is computed tilt angle;

$\phi$ is angular location on cal disk 19 (with respect to the origin of the sample data sets);

T is calibration disk maximum tilt angle; and

C is location of reference marker.

The corresponding voltage values, $v_x$ and $v_y$, are computed using the voltage functions found above. Given at least three sets of tilt angles and corresponding voltage values, the system of equations may be solved for the calibration coefficients as indicated at block 56.

In summary, the combined sinusoidal signals and the reference marker provide enough information to compute the set of tilt transformations (i.e., calibration coefficients) for converting from PSD voltage signals to tilt angles for a disk under inspection. Such calibration coefficients are typically stored in the computer system 32 for ready retrieval during inspection as indicated at block 58 in FIG. 4.

While the best mode for carrying out the invention has been described in detail, those familiar with the art to which this invention relates will recognize various alternative designs and embodiments for practicing the invention as defined by the following claims.

What is claimed is:

1. A method for calibrating a disk inspection system including a member for rotating a disk to be inspected about an axis, the method comprising the steps of:

securing a disk including a specular planar layer having a surface normal to the member to rotate therewith so that the surface normal is at a predetermined tilt angle with respect to the axis;

rotating the disk so that the disk has an angular velocity;

directing a beam of controlled light at the specular planar layer during the step of rotating to generate a corresponding reflected light signal having an angular displacement which varies during the step of rotating based on the tilt angle;

receiving the reflected light signal with an optical component for creating a relatively small focused spot of light from the reflected light signal in a detector plane wherein the optical component transforms the varying angular displacement of the reflected light signal into a curved displacement of the focused spot of light in the detector plane;

measuring position of radiant energy in the focused spot of light in the detector plane and producing a pair of electrical signals proportional to the curved displacement;

processing the pair of electrical signals with tilt angle data based on the tilt angle to obtain reference data; and storing the reference data in the tilt inspection system to calibrate the system.

2. The method as claimed in claim 1 further comprising the step of attenuating reflection of the beam of control light at a predetermined position on the disk, and wherein the method further comprises the step of measuring amount of radiant energy in the focused spot of light in the detector plane and producing a third electrical signal based on the amount of radiant energy and wherein the third electrical signal is processed with a pair of electrical signals and the tilt angle data to obtain the reference data.

3. The method as claimed in claim 1 wherein the step of measuring is accomplished with a two-dimensional position sensing detector positioned in the detector plane.

4. The method as claimed in claim 3 wherein the two-dimensional position sensing detector is a photodiode.

5. The method as claimed in claim 1 wherein the beam of controlled light is a collimated light beam.

6. The method as claimed in claim 5 wherein the collimated light beam is a laser beam.

7. The method as claimed in claim 1 wherein the step of measuring is accomplished with a position sensing detector positioned in the detector plane.

8. The method as claimed in claim 7 wherein the position sensing detector is a single photodetector.

9. The method as claimed in claim 7 wherein the position sensing detector is a semiconductor device.

10. The method as claimed in claim 9 wherein the semiconductor device is a photodiode.

11. The method as claimed in claim 1 wherein the optical component is a focusing lens.

12. The method as claimed in claim 1 wherein the disk is a compact disk.

13. The method as claimed in claim 1 wherein the disk is an optical disk.

14. The method as claimed in claim 1 wherein the step of processing includes the steps of converting the pair of electrical signals into corresponding first and second sets of data and fitting the first and second sets of data into corresponding sinusoidal functions.

15. The method as claimed in claim 1 wherein the step of rotating is performed at a substantially constant angular velocity.

* * * * *